(12) United States Patent
Bennis

(10) Patent No.: US 8,910,416 B2
(45) Date of Patent: Dec. 16, 2014

(54) FISH HOOK WITH BAIT AND FISH RETENTION FEATURES

(71) Applicant: Gary Bennis, Eau Claire, WI (US)

(72) Inventor: Gary Bennis, Eau Claire, WI (US)

( * ) Notice: Subject to any disclaimer, the term of this patent is extended or adjusted under 35 U.S.C. 154(b) by 0 days.

(21) Appl. No.: 13/947,763

(22) Filed: Jul. 22, 2013

(65) Prior Publication Data

US 2014/0182191 A1 Jul. 3, 2014

Related U.S. Application Data

(60) Provisional application No. 61/747,543, filed on Dec. 31, 2012.

(51) Int. Cl.
*A01K 83/06* (2006.01)
*A01K 83/00* (2006.01)
*A01K 83/04* (2006.01)

(52) U.S. Cl.
CPC .................. *A01K 83/06* (2013.01); *A01K 83/04* (2013.01); *A01K 83/00* (2013.01)
USPC .............................. 43/44.8; 43/44.2; 43/43.16

(58) Field of Classification Search
CPC ............................... A01K 83/00; A01K 83/06
USPC .............................. 43/43.16, 44.82, 44.2, 44.8
See application file for complete search history.

(56) References Cited

U.S. PATENT DOCUMENTS

| | | | |
|---|---|---|---|
| 13,649 A | 10/1855 | Johnson | |
| 523,988 A * | 8/1894 | Martin | 43/43.16 |
| 595,995 A * | 12/1897 | Dreese | 43/43.16 |
| 620,896 A * | 3/1899 | Edgar | 43/43.16 |
| 627,179 A * | 6/1899 | Dreese | 43/43.16 |
| 666,309 A * | 1/1901 | Fiege | 43/44.82 |
| 779,843 A * | 1/1905 | Fredricks | 43/43.16 |
| 831,552 A | 9/1906 | Hallstrom | |
| 1,502,781 A * | 7/1924 | Jamison | 43/43.16 |
| 1,875,182 A | 8/1932 | Southwell | |
| 2,164,807 A | 7/1939 | Evans | |
| 2,233,863 A * | 3/1941 | Driscoll | 43/43.16 |
| 2,317,900 A * | 4/1943 | Freeman | 43/44.82 |
| 2,540,276 A * | 2/1951 | Moler | 43/44.2 |
| 2,816,392 A * | 12/1957 | Goldberg et al. | 43/43.16 |
| 2,823,485 A * | 2/1958 | Traumuller | 43/43.16 |
| 2,841,914 A * | 7/1958 | Butler | 43/43.16 |
| 2,962,833 A * | 12/1960 | Stinson et al. | 43/44.8 |
| 3,333,359 A * | 8/1967 | Barker, Jr. | 43/44.8 |
| 4,028,838 A * | 6/1977 | Flower | 43/43.16 |
| 4,232,470 A | 11/1980 | Steffick, Jr. | |
| 4,835,898 A | 6/1989 | Pond | |

(Continued)

FOREIGN PATENT DOCUMENTS

EP 2204090 A1 7/2010
GB 3469AD1908 4/1908

(Continued)

*Primary Examiner* — Darren W Ark
(74) *Attorney, Agent, or Firm* — William D. Hare; McNeely Hare & War LLP

(57) ABSTRACT

The invention relates to a fish hook in the form of a wire includes a shank portion, a bend portion and a point portion. The hook further includes an offset in the wire, the offset being positioned within the bend portion adjacent to the point portion. The fish hook may further include a second offset in the wire, the second offset being positioned within the bend portion adjacent to the shank portion.

20 Claims, 23 Drawing Sheets

(56) References Cited

U.S. PATENT DOCUMENTS

| | | | |
|---|---|---|---|
| 4,905,402 A | 3/1990 | Clark | |
| D371,594 S * | 7/1996 | Drapak et al. | D22/144 |
| 5,664,364 A | 9/1997 | Clark | |
| 5,685,108 A * | 11/1997 | Lepage et al. | 43/43.16 |
| D392,715 S | 3/1998 | Reed | |
| 6,189,257 B1 | 2/2001 | Ulrich | |
| 6,519,895 B1 | 2/2003 | Bennett | |
| 6,779,295 B2 | 8/2004 | Davidson | |
| 7,225,582 B2 * | 6/2007 | Shay | 43/43.16 |
| D553,220 S | 10/2007 | Merritt | |
| D556,292 S | 11/2007 | Shelton | |
| D586,424 S | 2/2009 | Gibbs | |
| D616,060 S | 5/2010 | Patrick | |
| D636,456 S | 4/2011 | Hatfield | |
| D636,457 S | 4/2011 | Hatfield | |
| D657,842 S | 4/2012 | Martin | |
| 8,201,358 B2 * | 6/2012 | Dohi | 43/43.16 |
| D671,617 S | 11/2012 | Martin | |
| D698,413 S * | 1/2014 | Bennis | D22/144 |
| 2002/0148156 A1 | 10/2002 | Damm | |
| 2004/0134118 A1 | 7/2004 | Miller et al. | |
| 2005/0252073 A1 * | 11/2005 | Shay | 43/43.16 |
| 2008/0047192 A1 | 2/2008 | Bennis | |
| 2008/0083154 A1 | 4/2008 | Gregory | |
| 2009/0000179 A1 * | 1/2009 | Dohi | 43/43.16 |
| 2009/0151220 A1 | 6/2009 | Park | |
| 2012/0291334 A1 | 11/2012 | Bartell | |

FOREIGN PATENT DOCUMENTS

| | | | | |
|---|---|---|---|---|
| GB | 223137 | | 10/1924 | |
| GB | 2267423 A | * | 12/1993 | A01K 83/00 |
| JP | 03198732 A | * | 8/1991 | A01K 83/00 |
| JP | 10084825 A | * | 4/1998 | A01K 83/00 |
| JP | 2000316424 A | * | 11/2000 | A01K 83/00 |
| JP | 2001128591 A | * | 5/2001 | A01K 83/00 |
| JP | 2002209475 A | * | 7/2002 | A01K 83/00 |
| JP | 2002360123 A | * | 12/2002 | A01K 83/00 |
| JP | 2003079274 A | * | 3/2003 | A01K 83/00 |
| JP | 2004129645 A | * | 4/2004 | A01K 83/06 |
| JP | 2005253461 A | * | 9/2005 | A01K 83/06 |
| WO | WO 9704648 A1 | * | 2/1997 | A01K 83/00 |

* cited by examiner

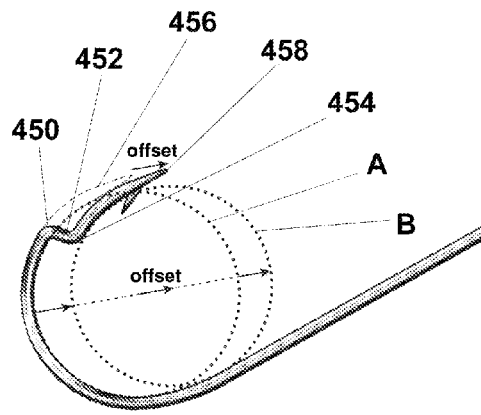 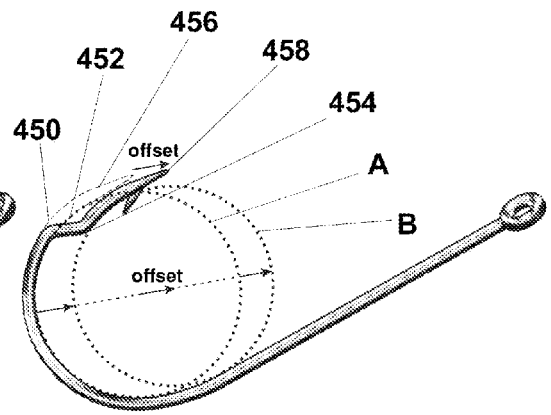
Figure 11A    Figure 11B
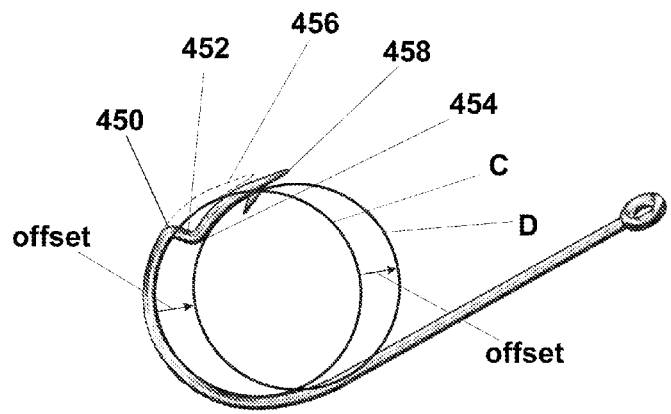
Figure 12

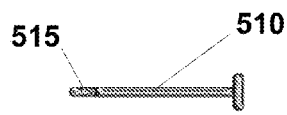
Figure 13E
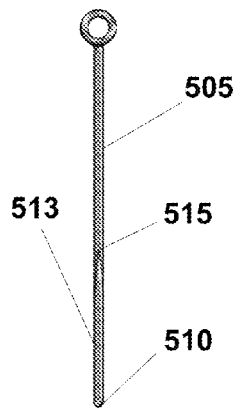
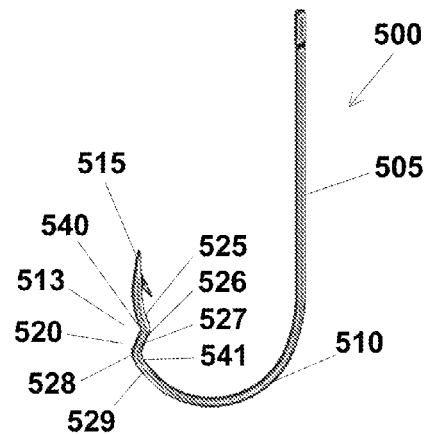
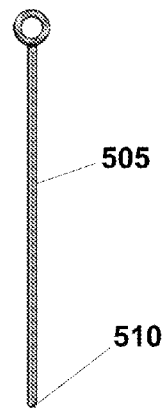
Figure 13D     Figure 13A     Figure 13B
Figure 13C

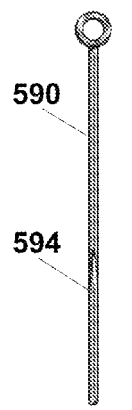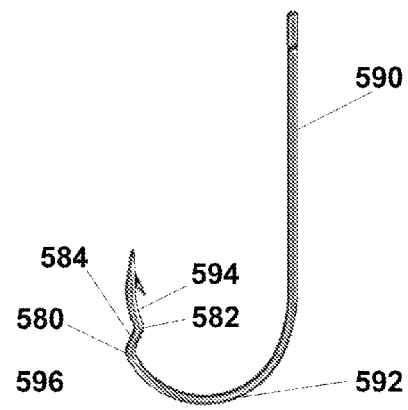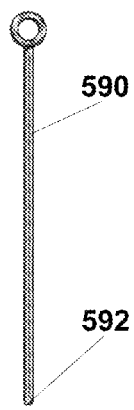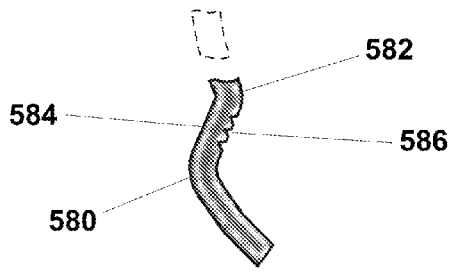
Figure 15E
Figure 15D  Figure 15A  Figure 15B
Figure 15C
Figure 15F

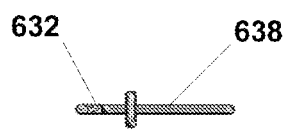
Figure 17E
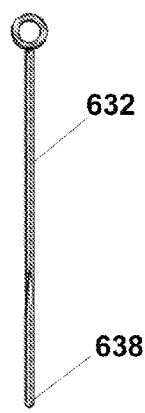 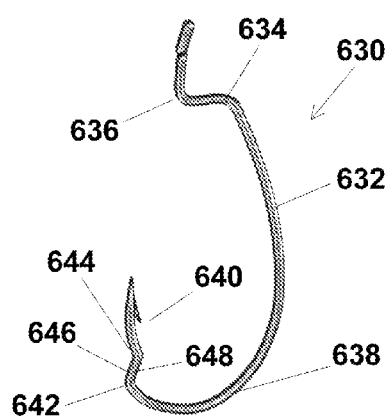 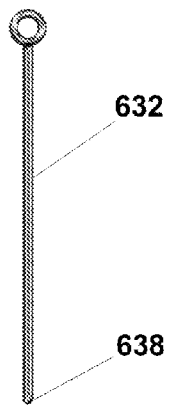
Figure 17D  Figure 17A  Figure 17B
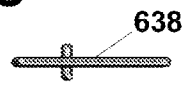
Figure 17C

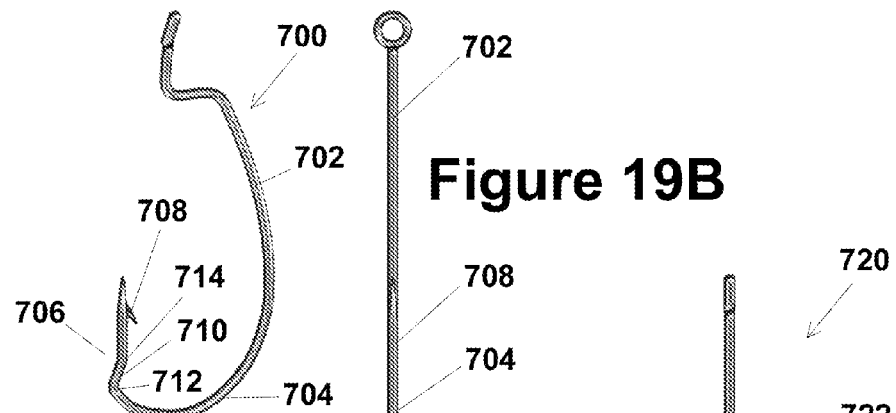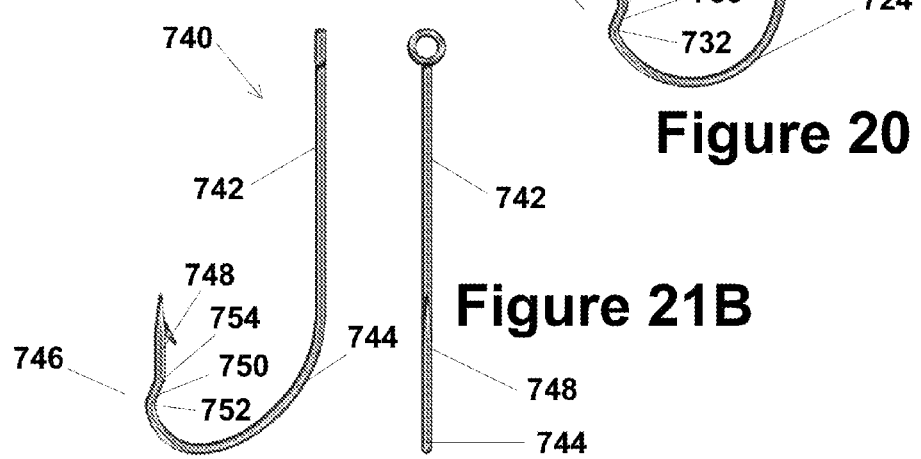

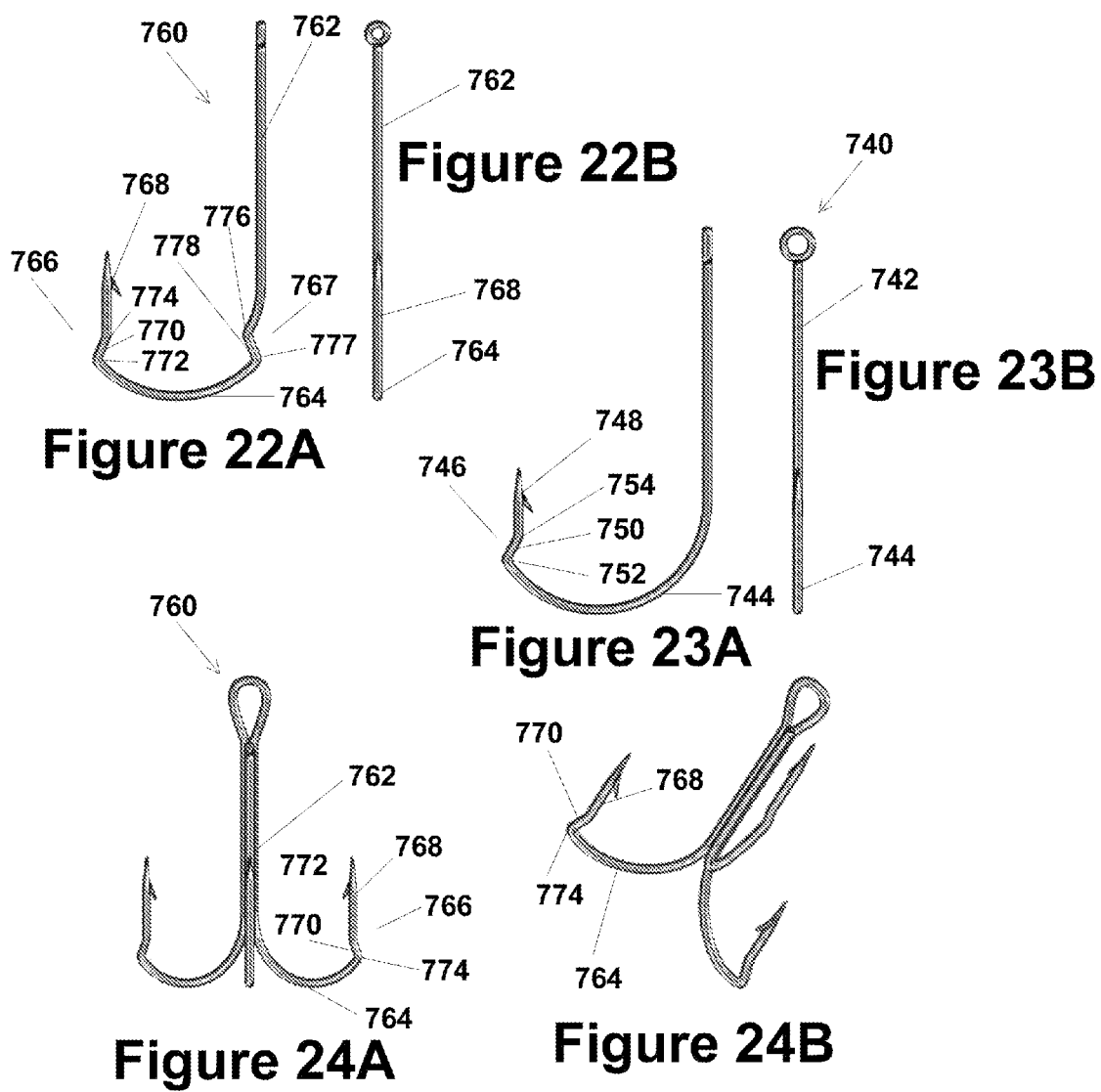

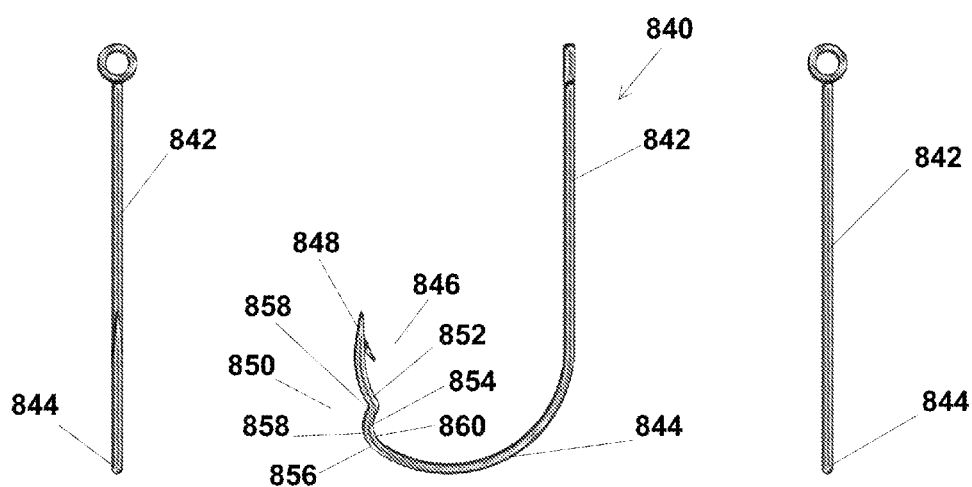

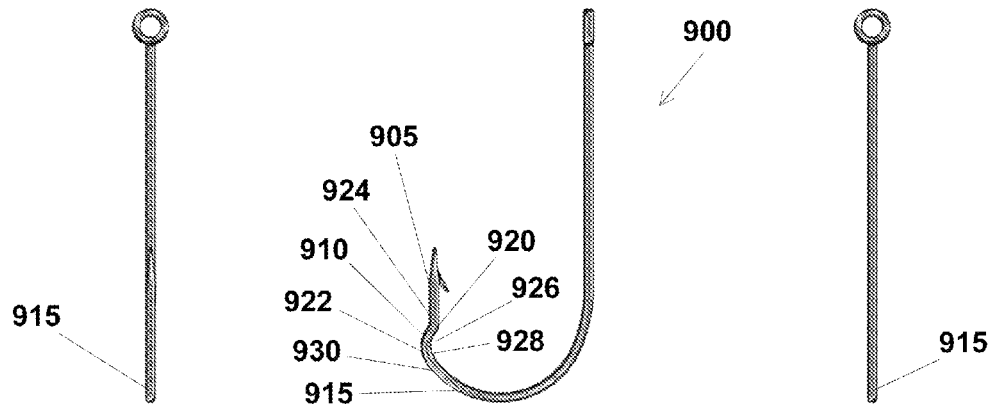

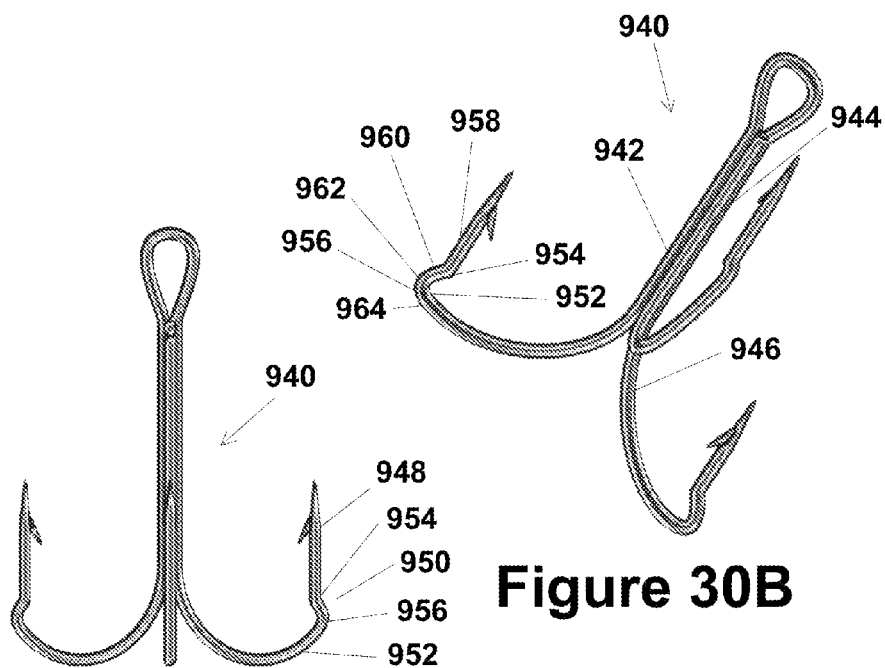
Figure 30B
Figure 30A
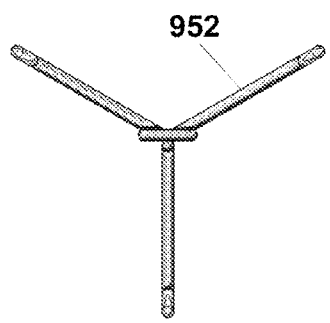
Figure 30C

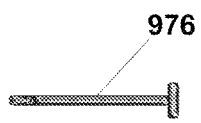
Figure 31E
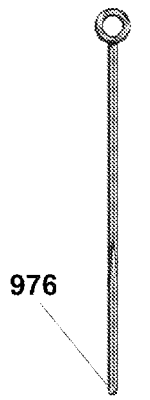 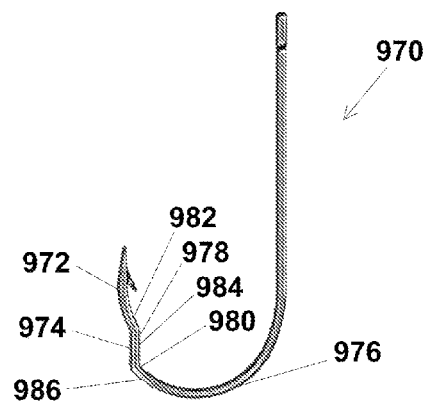 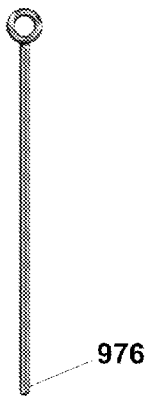
Figure 31D　Figure 31A　Figure 31B
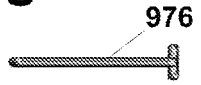
Figure 31C

FISH HOOK WITH BAIT AND FISH RETENTION FEATURES

CROSS-REFERENCE TO RELATED APPLICATIONS

The present application relates to, and claims priority to U.S. Provisional Patent Application Ser. No. 61/747,543 filed on Dec. 31, 2012, which is entitled "Fish Hook with Bait and Fish Retention Features", the contents of which is incorporated herein in its entirety by reference.

TECHNICAL FIELD

The field of the invention generally relates to fish hooks having offsets to improve the retention of bait (live and artificial), caught fish and trailer hooks to the hook.

BACKGROUND

Referring to FIG. 1, a conventional fishing hook 10 includes an eyelet 15, a shank 20, a bend 25, an optional barb 30, and a point 35. The gap 40 is defined as the distance between the point and the shank. The throat 45 is defined as the distance from a line from the point to the bottom of the bend. The front length of the hook is defined as the distance from the point 35 to the bend 25. As known by anglers, the angler ties the fishing line to the eyelet. In fishing, anglers put live bait, such as a worm or minnow, on the hook. If the angler is using a minnow, the minnow is positioned by the angler in the bend region. Similarly, if the angler is using a worm, the angler feeds the worm onto the hook and positions the worm in the bend region. An angler also may use an artificial lure on the hook by inserting the point into the lure and threading the artificial lure on to the hook such that the lure resides on the shank.

Referring to FIG. 2, another conventional fishing hook is a trailer hook system 50. A trailer hook system includes a leading hook 55, which may be a spinner bait, buzz bait or worm fishing hook, etc., and a trailer hook 60. The trailer hook has a connector portion formed at one of its ends, and the leading hook has a bend or curved portion. The connecting portion of the trailer hook resides in the bend or curve portion of the leading hook.

Oftentimes the angler doesn't even notice that the minnow or other type of bait has escaped the bend and slid to the front end of his or her fishhook, especially if one casts the fishing line far away from the boat. Also an angler attaches sinkers to a fishing line by placing weights above the fishhook, thus causing the fishhook and bait to immediately submerge when the fishhook and weights reach the water, thereby further limiting the angler's capability to observe the fishhook and minnow. The present invention thus provides an improved fishhook that retains bait on the bend region of the fishhook and prevents the bait from wriggling or sliding off the fishhook.

FIG. 10 reproduces the hook disclosed in U.S. Pat. No. 1,502,781 and GB 223,137, authored by Jamison, which includes a point section 4, a curved segment 5, a bend section 7 and includes a number of turns in the wire along the length of the point section of the hook such that at least three angles created by the turns in the wire can be identified: a first angle between the bend of the hook 7 and the first segment of the wire that leads to the peak of the curved segment 5, designated as 6, a second angle between the second segment of the wire that leads to the peak of the curved segment and the point of the hook 4, designated as 6' and a third angle existing on the opposite side of the peak of the curved segment 5. It is possible that there are actually four angles in the curved segment depending on how the peak 5 of the curved segment is viewed. In the description above, the peak has a single angle in which the wire changes direction from moving inwards to moving outwards. Alternatively, the peak 5 can be viewed as a straight section over a short length in which there are two angled portions: a first angled portion where the lower angle 6 intersects peak 5 and a second angled portion where the peak intersection with the upper angle 6. In such an interpretation, the curved segment of Jamison is made up of four angles.

This curved segment existing in the Jamison hook does not satisfactorily solve the problem of retaining bait in a limited region of the bend of the hook and providing an obstacle to the caught fish coming off of the hook. Instead, it is believed that using the Jamison hook could result in the bait sliding along the curved segment and off the point of the hook due to the wire not being sufficiently angled so as to retain the bait.

For example, when fishing with live bait, such as a minnow, the point of the fishhook is inserted through the skin on the back of the minnow thus forming a fishhook hole in the minnow's back. After attachment, the minnow is not killed but can still generate a swimming motion while held on the fishhook and thereby entice fish to bite the minnow. However, the gradual curved segment of the Jamison hook is believed to be insufficient to hinder the swimming minnow from sliding off the hook. Furthermore, as the minnow wriggles while attached to the hook, the placement of the hook within the minnow's skin can become enlarged, thus making it easier for the minnow to slide past the gradual curved segment of the Jamison hook and leave the bend of the fishhook. By contrast, the present invention seeks to resolve the problem associated with the Jamison hook by providing a hook that has an offset created by turns in the wire adjacent to or in the bend segment which creates an offset sufficient to retain bait in a limited region of the bend.

The Jamison hook also fails to include an offset that moves the point inwards towards the shank portion of the fish hook, thereby providing a more effective means of retaining bait than that which is disclosed in Jamison. Having an offset allows the distance between the shank and the tip, hereinafter called the gap, to be decreased, which is advantageous because it allows the fish to more easily inhale and thereafter attach to the hook.

SUMMARY

In one general aspect the invention relates to a fish hook in the form of a wire having a shank section, a bend section, a front length section including a point, and an offset section positioned between the front length section and the bend section. The offset section includes a first turn in the wire and a second turn in the wire to form an offset segment between the first and second turns in the wire, wherein the shank portion, bend portion, front length portion, first and second turns in the wire, and the offset section are positioned within a single plane. The bend portion has a first radius of curvature at a position adjacent to the first turn in the wire at a location that is not within the offset segment and has a second radius of curvature at a position adjacent to the second turn in the wire at a location that is not within the offset segment.

The first radius of curvature and the second radius of curvature are substantially the same or different.

The offset segment creates an offset that offsets the front length portion from the bend portion such that a projection of the bend portion and front length portion without the offset would be substantially parallel to but not collinear with the bend portion and front length portion with the offset. The fishing hook is free of a second offset section that returns the wire of the hook to a position collinear or substantially collinear with the projection of the bend portion.

Embodiments of the fish hook may include one or more of the following features. For example the first turn in the wire may consists of a first line segment and a second line segment joined together to form a first angle and the second turn in the wire may consists of a third line segment and a fourth line segment joined together to form a second angle, the second line segment and the third line segment being a common segment in common between the two turns, the first angle being located closer along the wire to the shank portion and the second angle being located closer along the wire to the front length portion. The first angle and the second angle may each independently be between about 75° and 135°.

The first radius of curvature and the second radius of curvature may be substantially the same. The first radius of curvature and the second radius of curvature may be different and the second radius of curvature may be substantially straight.

The fish hook may further include a third turn and a fourth turn in the wire, the third turn being positioned within the bend portion adjacent to the shank portion and the fourth turn being positioned adjacent to the shank portion or in the shank portion with the fourth turn being positioned closer in the wire to the eyelet relative to the third turn and the third turn being positioned further in the wire from the eyelet relative to the fourth turn.

The third turn in the wire may consist of a fifth line segment and a sixth line segment joined together to form a third angle and the fourth turn in the wire may consist of a seventh line segment and an eighth line segment joined together to form a fourth angle, the sixth segment and the seventh line segment being a common segment in common between the two turns, the fourth angle being located closer along the wire to the shank portion and the third angle being located closer along the wire to the front length portion.

The third and fourth turns in the wire may be positioned to be symmetric to the first and second turns, respectively, in the wire.

The shank portion may be free of a turn in the wire that is in the proximity of an eyelet of the fish hook. The shank portion may be free of a turn in the wire other than a turn in the wire that is adjacent to the bend portion.

The hook may include a single offset segment and the offset segment consists of two turns joined by the offset segment. The offset segment may be approximately between about 1-20 mm in length. The offset segment may be substantially parallel to the shank portion of the hook. The hook may have an offset segment in the form of a trailer hook.

The gap of the hook at a lower portion of the hook may be less than the gap of the hook at a higher portion of the hook.

The shank portion of the hook may be free of an offset other than a offset that is adjacent to or in the bend portion.

The fish hook may be one hook of multiple hooks sharing a common eyelet, wherein each hook has an offset segment in the wire, the offset segment being positioned within the bend section adjacent to the front length section. For example, the hook may be a treble hook.

The fish hook may further include one or more circumferential grooves formed within the wire in the offset segment.

In another general aspect, the invention relates to a fish hook in the form of a wire having a shank section, a bend section, a front length section including a point, and an offset section positioned between the front length section and the bend section. The offset section includes a first turn in the wire and a second turn in the wire to form an offset segment between the first and second turns in the wire, wherein the shank portion, bend portion, front length portion, first and second turns in the wire, and the offset section are positioned within a single plane.

The bend portion has a first radius of curvature at a position adjacent to the first turn in the wire at a location that is not within the offset segment and the front length portion is substantially straight at a position adjacent to the second turn in the wire at a location that is not within the offset segment.

The offset segment creates an offset that offsets the front length portion from the bend portion such that a projection of the bend portion and front length portion without the offset would be substantially parallel to but not collinear with the bend portion and front length portion with the offset.

The fish hook is free of a second offset section that returns the wire of the hook to a position collinear or substantially collinear with the projection of the bend portion.

Embodiments of the fish hook may include one or more of the features described above or elsewhere herein. For example, the offset segment may be substantially parallel to a portion of the shank section.

DESCRIPTION OF THE DRAWINGS

FIGS. 11A and 11B are side views of a fish hook depicting two embodiments of the offset of the invention and illustrating the configuration of the offset.

FIG. 12 is a side views of a fish hook depicting one embodiments of the offset of the invention and illustrating the configuration of the offset.

FIGS. 13A-E are side, rear, bottom, front and top views, respectively, of a first embodiment of a fish hook having a retention offset.

FIGS. 15A-E are side, rear, bottom, front and top views, respectively, of a fish hook having a retention offset and a grooved segment in the offset segment and FIG. 15F is an enlarged view of the grooved segment in the offset segment.

FIGS. 17A-E are side, rear, bottom, front and top views, respectively, of a fish hook having a retention offset.

FIGS. 19A-B are side and front views, respectively, of a fish hook having a retention offset and a straight front length section.

FIG. 20 is a side view of a fish hook having a retention offset and a straight front length section.

FIGS. 21A-B are side and front views, respectively, of a fish hook having a retention offset and a straight front length section.

FIGS. 22A-B are side and front views, respectively, of a fish hook having a pair of retention offsets and a straight front length section.

FIGS. 23A-B are side and front views, respectively, of a fish hook having a pair of retention offsets and a straight front length section.

FIGS. 24A-B are side and perspective views, respectively, of a treble fish hook having a retention offset and a straight front length section on each hook.

FIGS. 26A-E are side, rear, bottom, front and top views, respectively, of an embodiment of a fish hook having a retention offset in which the offset is formed with one clearly delineated angle and one curved angle.

FIGS. 29A-E are side, rear, bottom, front and top views, respectively, of an embodiment of a fish hook having a retention offset in which the offset is formed with one clearly delineated angle and one curved angle, and the front length of the fish hook is straight and substantially parallel to the shank section.

FIGS. 30A-C are side, perspective and top views, respectively, of an embodiment of a treble fish hook having a retention offset in which the offset is formed with one clearly delineated angle and one curved angle, and the front length of each fish hook is straight and substantially parallel to the shank section.

FIGS. 31A-E are side, rear, bottom, front and top views, respectively, of an embodiment of a fish hook having a retention offset in which the offset is substantially parallel to the shank section.

FIGS. 32A-E are side, rear, bottom, front and top views, respectively, of an embodiment of a fish hook having a retention offset with an outer barb at the point of the hook.

DETAILED DESCRIPTION

Figure 1:
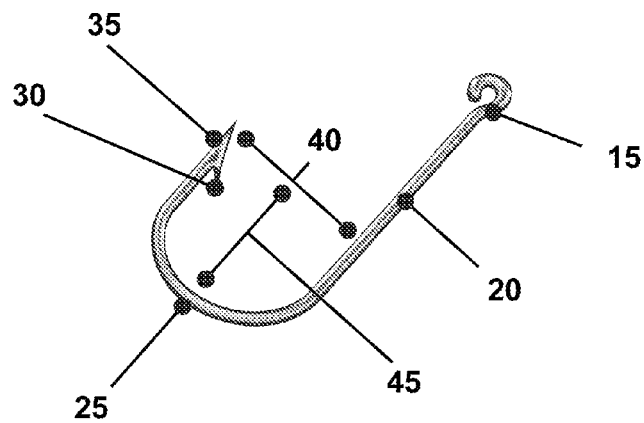
FIG. 1 is a side view of a conventional fish hook.
Figure 2:
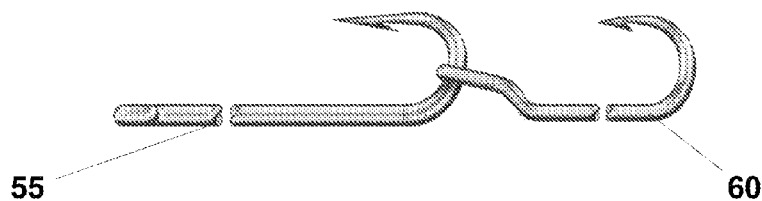
FIG. 2 is a side view of a conventional trailer fish hook.

The inventor has developed a line of fish hooks that are intended to accomplish a number of objectives for an angler, including one or more of retaining artificial or live bait to a fish hook, retaining the bait on the hook in a desired location, retaining a trailer hook on a hook, retaining a caught fish to a fish hook, and avoiding the damage a barb inflicts upon a caught fish when the fish moves back and forth against the barb. One or more of these objectives are attained by providing one offset segment or a pair of offset segments in the hook on opposite sides of, but adjacent to or in, the bend section of the hook, with the segments forming the offset segment being sufficiently angled so as to form an offset that moves, or offsets, the point inwards towards the shank portion of the fish hook, thereby providing a more effective means of retaining bait than that which is disclosed in the prior art. In other embodiments, the one or both offset segments are within the bend section of the hook.

As explained in more detail below, the hooks disclosed herein differ significantly from known hooks with a curved segment in the shank adjacent to the eyelet. Such hooks are intended to prevent an artificial lure from sliding up the hook onto the fishing line. Such configurations do nothing to address the inventor's objectives of retaining the bait in a limited region of the bend of the hook and providing an obstacle to the caught fish coming off of the hook. Further, such prior art hooks have the curved segment of the hook only in the shank and only adjacent to the eyelet rather than adjacent to or in the bend segment of the hook.

Additionally, those prior art hooks which do appear to have an offset segment located adjacent to the bend segment, such as the Jamison hook disclosed in U.S. Pat. No. 1,502,781 and GB 223,137, are not sufficient to retain bait in a limited region of the bend. For example, when fishing with live bait, such as a minnow, the point of the fishhook is inserted through the skin on the back of the minnow thus forming a fishhook hole in the minnow's skin. After attachment the minnow is not killed but can still generate a swimming motion while held on the fishhook and thereby entice fish to bite the minnow. The curved segment of the Jamison hook is believed to be insufficient to hinder the swimming minnow from wriggling off the hook. Furthermore, as the minnow wriggles while attached to the hook, the placement of the hook within the minnow's skin can become enlarged, thus making it easier for the minnow to slide past the gradual angles of the curved segment of the Jamison hook and leave the bite/throat region of the fishhook.

The hooks disclosed herein also differ significantly from known hooks in that none disclose an offset that moves or offsets the point inwards towards the shank portion of the fish hook, thereby providing a more effective means of retaining bait and also allowing the fish to more easily inhale and thereafter attach to the hook.

The curved segment and offset created by angled segments of wire will be further described in this section.

Figure 3:
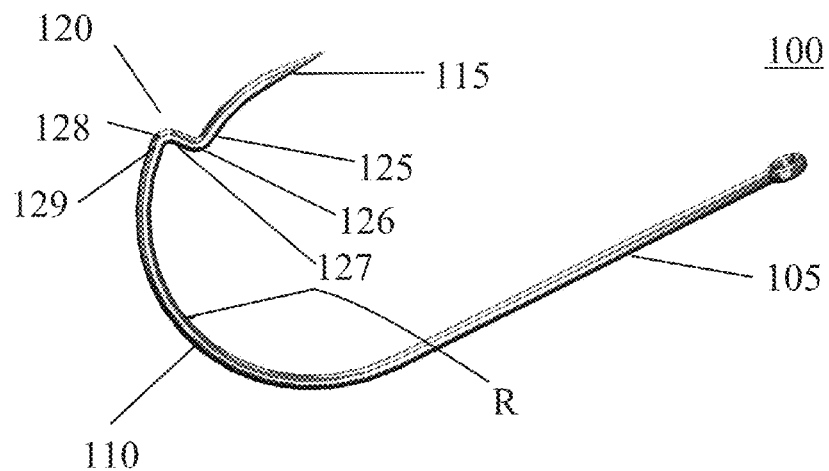
FIG. 3 is a side view of a barbless fish hook having a retention curved segment adjacent to the bend.

Referring to FIG. 3, a barbless hook 100 includes a shank section 105, a bend section 110, and a point section 115. The hook 100 also includes a curved segment 120 positioned adjacent to the bend section 110 and the point 115. The curved segment 120 is made up of one or more turns that include multiple segments 125, 126, 127, 128, 129.

The one or more turns and segments may have a variety of shapes, such as C, S, U, V, W, N, M, or Z, or variations of these arrangements of turns and segments. For example, the angles formed by joining segments can range from sharp to blunt, e.g., an S shape in comparison to a Z shape. For example, two joining segments can have an angle ranging from about 1 degree to about 155 degrees, which includes each individual degree within that range. In a particularly preferred embodiment two joining segments of the wire may have an angle of from about 75 degrees to about 135 degrees and even more preferably from about 90 degrees to about 120 degrees. It should be understood that larger angles are possible if they are configured such that they present an obstacle to the fish or lure coming off of the hook. The offset segment may have a curved configuration or a sharp configuration. Again, the objective of the offset segment is to retain an object on the hook and a variety of configurations ranging from curved to sharp may be used.

It should be noted from FIG. 3, that the bend section 110 has a radius of curvature R which appears to continue into the point section 115. However, in FIG. 3 the bend section is shown as being interrupted by the offset segment 120 with the segment causing the bend section to be offset with respect to the bend section merging into the point section. This offset can be eliminated by including additional segments in the curved segment such that the radius of curvature continues without offset. For example, if a segment of the hook parallel to and oriented oppositely to segment 127 is added to the hook, the wire of the hook will return to the projection of the bend section, and thereby eliminate the offset. This explanation is noted such that one of skill in the art will understand the difference between the embodiments with an offset and hooks without an offset.

It should be noted that the offset segment 120 and the front length, bend and shank of the fish hook 100 are shown as being in a single two dimensional plane. Depending upon the orientation of the eyelet, the eyelet may extend into a different plane from the remainder of the hook.

When the hook 100 is used by an angler, the hook is attached to the fishing line in the conventional manner. Similarly, the bait is attached to the hook in the conventional manner except that the bait is threaded over the offset segment 120 onto the bend. Because the offset segment 120 is below the point and adjacent to or slightly in the bend, the offset segment will prevent the bait from coming off of the hook at the point end of the hook. Then the angler places the hook and bait in the water, through either casting or dropping the line into water. When a fish then attacks the bait and the point of the hook passes through the fish's mouth, the hook will have a tendency to continue through the fish such that the offset segment 120 passes through the fish. In this configuration, the offset segment 120 will then serve to retain the fish on the hook because it will impede the ability of the hook to throw the hook.

In a variation of the barbless fish hook 100, one or more sections of the hook may be grooved to hinder the ability of the bait to come off the hook or the caught fish to throw the hook. The grooves can be in a variety of shapes, including V-shaped, U-shaped, W-shaped, etc. Referring to the offset segment 120, in one preferred embodiment, the grooves can be placed in the segment 127. With the grooves in this section 127, the grooves will hinder the ability of, for example, a fish to throw the hook. It should be understood that to provide an optimal effect, the grooves should be on the surface of the hook on an inside surface of a bend, such as section 127, because when a fish is caught the hook will be in tension against the fish such that the opening through the fish in which the hook passes can reside in the groove. The grooves may be in the form of circumferential grooves that encircle the entire circumference of the wire or only part of the circumference of the wire. It should be understood that the grooves described above can be applied to any of the hooks described herein. Further, it should be understood that the grooves can be used instead of a barb or in addition to a barb.

Figure 4:
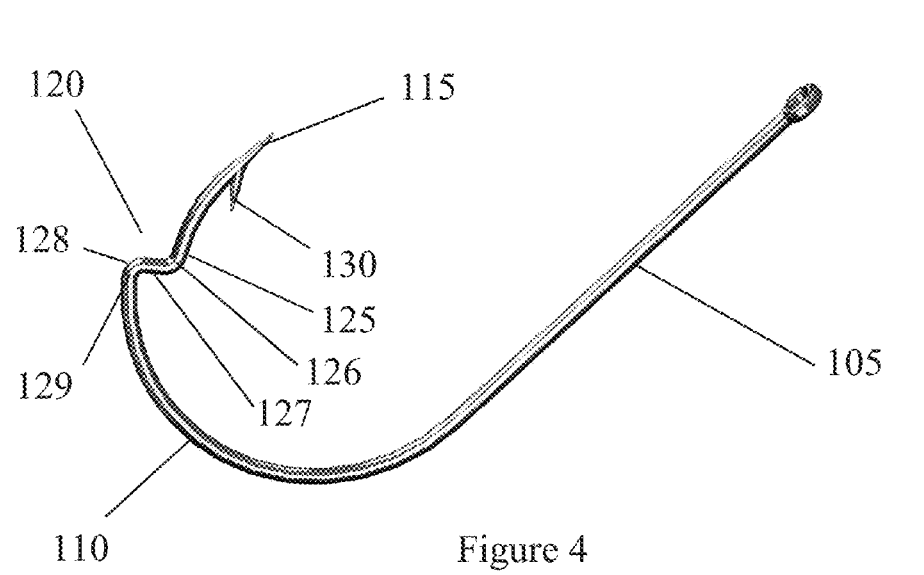
FIG. 4 is a side view of a barbed fish hook having a retention curved segment adjacent to the bend.

Referring to FIG. 4, a barbed hook 101 includes a shank section 105, a bend section 110, a point section 115, and a barb 130 adjacent in the point section. The hook 100 also includes a offset segment 120 positioned adjacent to the bend section 110 and the point 115. Like the hook 100, the offset segment 120 of hook 101 is made up of one or more turns that include multiple segments 125, 126, 127, 128, 129.

One advantage of the barbless hook 100 in comparison to the barbed hook 101 is the lack of a barb. While a barb is useful in preventing a caught fish from throwing the hook, the barb can also further injure the fish when the fish moves on the hook trying to escape the hook. The pointed end of the barb will scratch and gouge the lip and face of the fish. If the angler is practicing catch-and-release fishing, then there may a reduced likelihood that the fish will survive when the fish is returned to the water.

Figure 5:
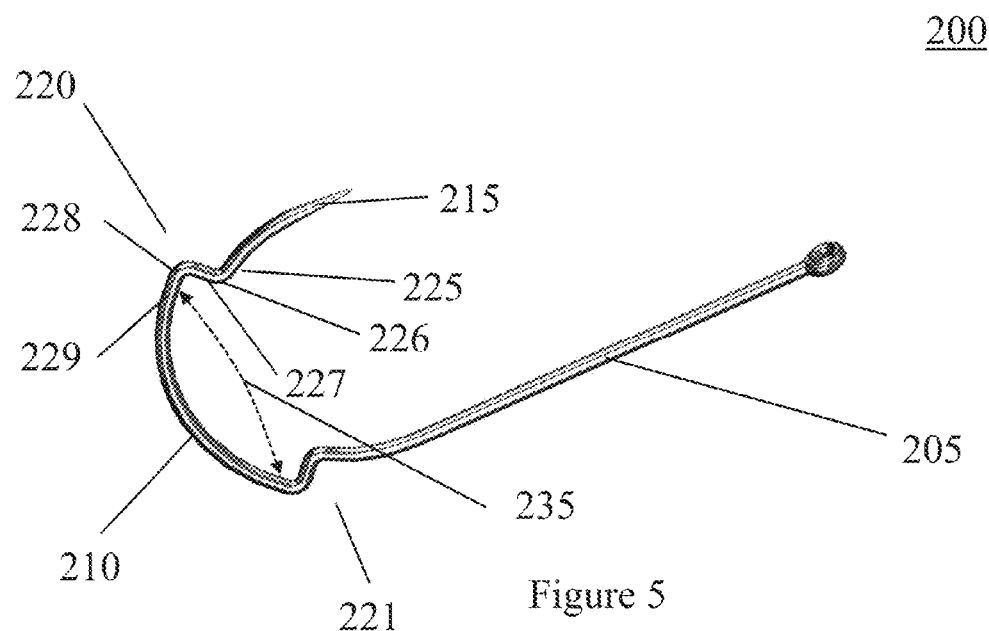
FIG. 5 is a side view of a barbless fish hook having a first retention curved segment adjacent to the bend and a second retention curved segment adjacent to the shank.

Referring to FIG. 5, in a variation of the fish hook with retention features 100, a hook 200 includes a shank section 205, a bend section 210, and a point section 215. The hook 200 also includes a pair of offset segments 220, 221 positioned adjacent to the bend section 210 and the point 215. The offset segment 220 of the hook 200 is made up of one or more turns that include multiple segments 225, 226, 227, 228, 229. Similarly, the offset segment 221 includes one or more turns that include multiple segments (unnumbered).

Based on the pair of offset segments 220, 221, the hook 200 includes a segment 235 defined as the region in the bend section between the offset segments. The segment 235 is intended to more securely retain bait, a caught fish, and a trailer hook. For example, a minnow placed on the hook 200 will be retained within the segment 235 based on the obstruction to its removal caused by the offset segments 220, 221. This advantageously prevents the minnow from moving out of either side of the bend 210. Specifically, the minnow will be hindered from moving up the shank in one direction or over the point in the other direction. A worm placed on the hook similarly will be retained within the section 235 of the bend 210.

Figure 6:
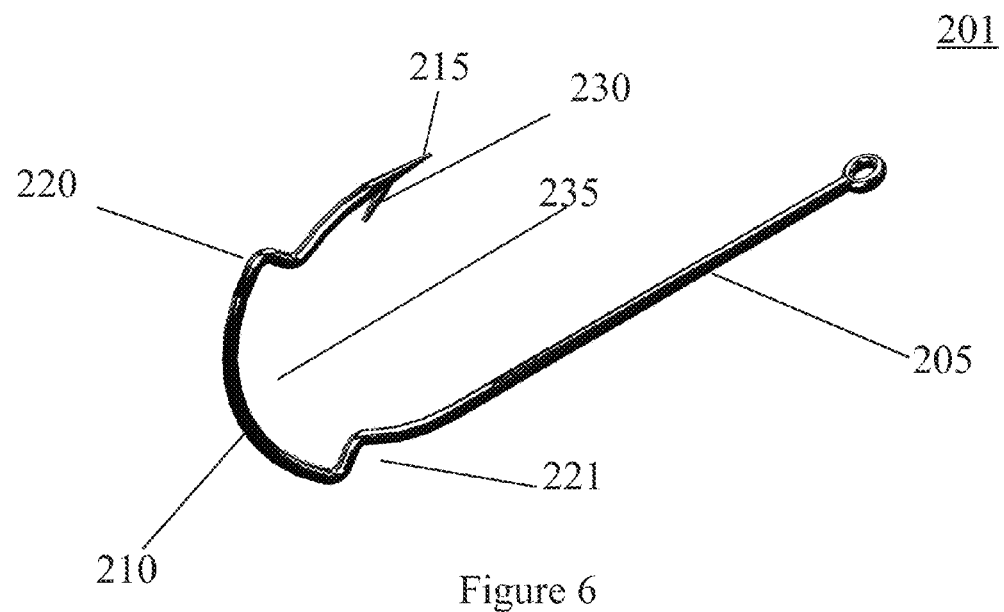
FIG. 6 is a side view of a barbed fish hook having a first retention curved segment adjacent to the bend and second retention curved segment adjacent to the shank.

Referring to FIG. 6, a barbed hook 201 includes a shank section 205, a bend section 210, a point section 215, and a barb 230 adjacent in the point section. The hook 201 also includes a pair of offset segments 220, 221 positioned adjacent to the bend section 210 and the point 215. Like the hook 200, the offset segments 220, 221 of hook 201 is made up of one or more turns that include multiple segments 225, 226, 227, 228, 229.

Figure 7:
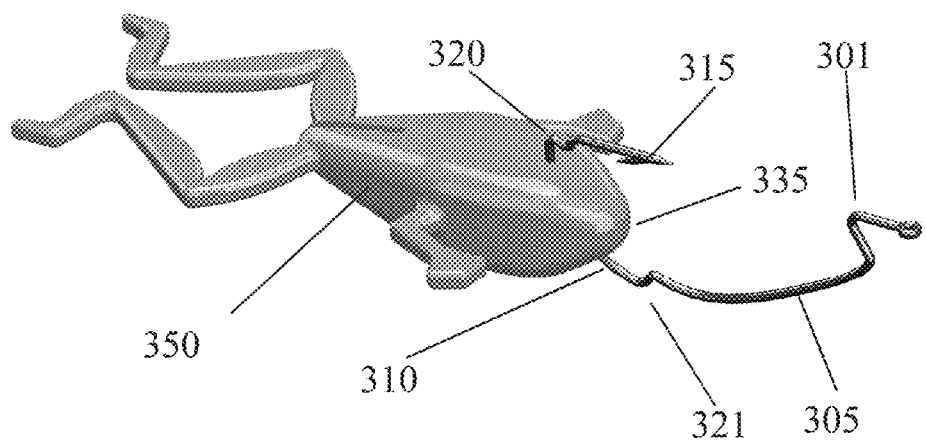
FIG. 7 is a perspective view of the fish hook of FIG. 6 to which an artificial frog lure is attached.

Referring to FIG. 7, in a variation of the dual offset segment hook 201, a hook 301 that is typically used in a Carolina Rig set up is modified to include a pair of offset segments 320, 321. The pair of offset segments 320, 321 form a region 335 in which the bait is retained. The hook 301 also includes a shank segment 305, a bend segment 310 and a point segment 315 from which a barb extends. In FIG. 7, an artificial lure 350 in the configuration of a frog is attached to the hook and retained in the segment 335 within the bend section 310. The hook 301 differs from the above hooks based on the configuration of the shank adjacent to the eyelet. The hook 200, 201 has a straight shank that terminates at the eyelet while the hook 301 has a shank that has a V-shaped bend in the straight section of the shank adjacent to the eyelet. As seen in FIG. 7, the configuration of the V-shaped bend in the shank causes the section of the shank adjacent to the eyelet to be generally collinear with the point section of the hook.

Figure 8:
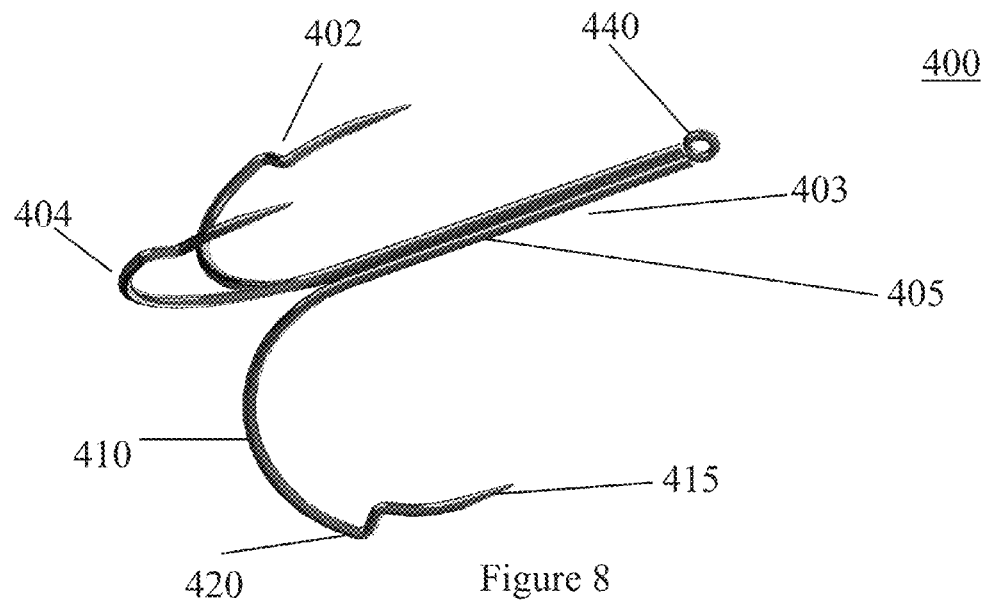
FIG. 8 is a side view of a barbless treble hook having a retention curved segment adjacent to the bend.
Figure 9:
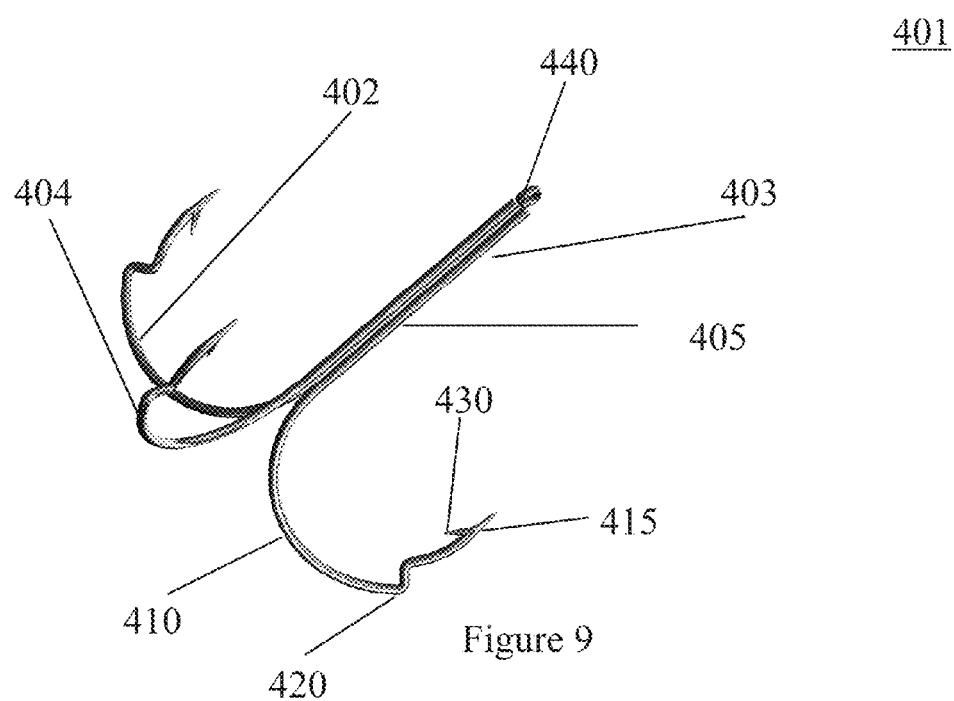
FIG. 9 is a side view of a barbed treble hook having a retention curved segment adjacent to the bend.

Referring to FIG. 8, in a modification of the hooks described above, a barbless treble hook 400 includes three hooks 402, 403, 404 whose shanks terminate in a common eyelet 440. Each of the hooks 402, 403, 404 has the same configuration. The hook 403 has a shank section 405, a bend section 410, and a point section 415 from which a barb 420 extends. Like hook 100, the hook 403 has an offset segment 420 that is made up of one or more turns. Referring also to FIG. 9, in a variation of the barbless treble hook 400, a barbed treble hook 401 includes three barbed hooks 402, 403, 404, with each hook having an offset segment 420.

Figure 10:
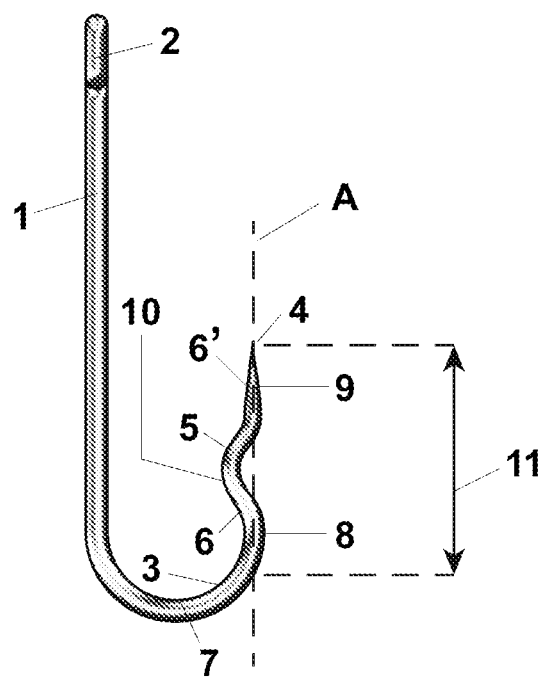
FIG. 10 is a side view of a prior art fish hook that does not include an offset.
Figure 14E:
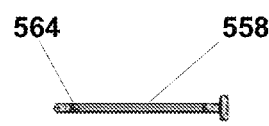
FIGS. 14A-E are side, rear, bottom, front and top views, respectively, of a fish hook having a pair of retention offsets.
Figures 14A, 14B, 14D:
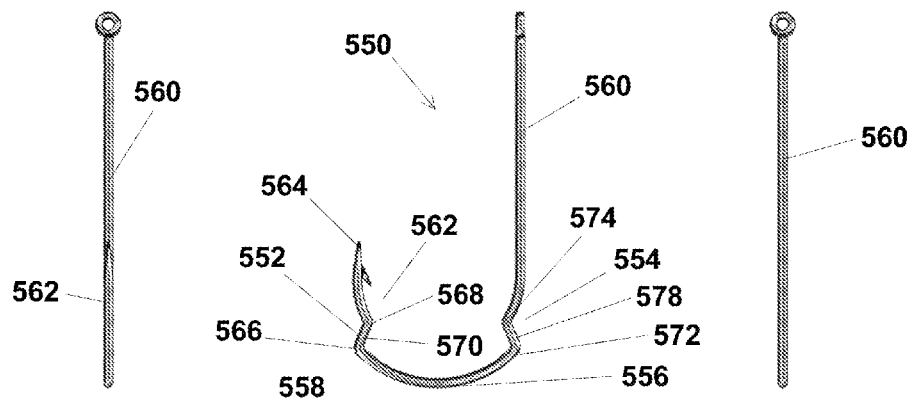
Figure 14C:
Figure 16A:
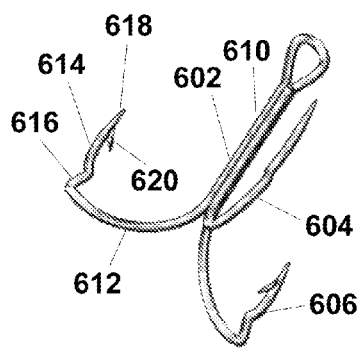
FIGS. 16A-E are perspective, front, side, top and bottom views, respectively, of a triple fish hook having a retention offset on each hook.
Figure 16B:
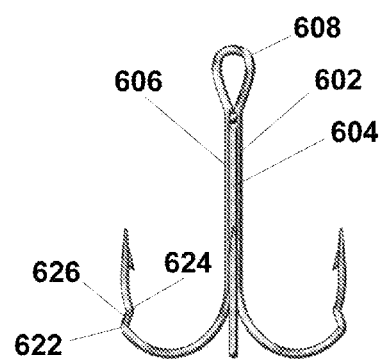
Figure 16C:
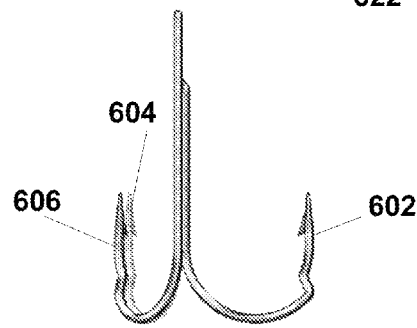
Figure 16D:
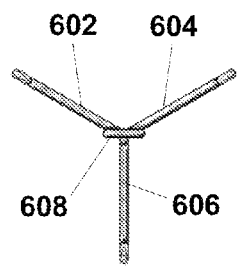
Figure 16E:
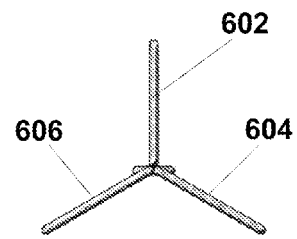
Figures 18A, 18B, 18C, 18D, 18E:
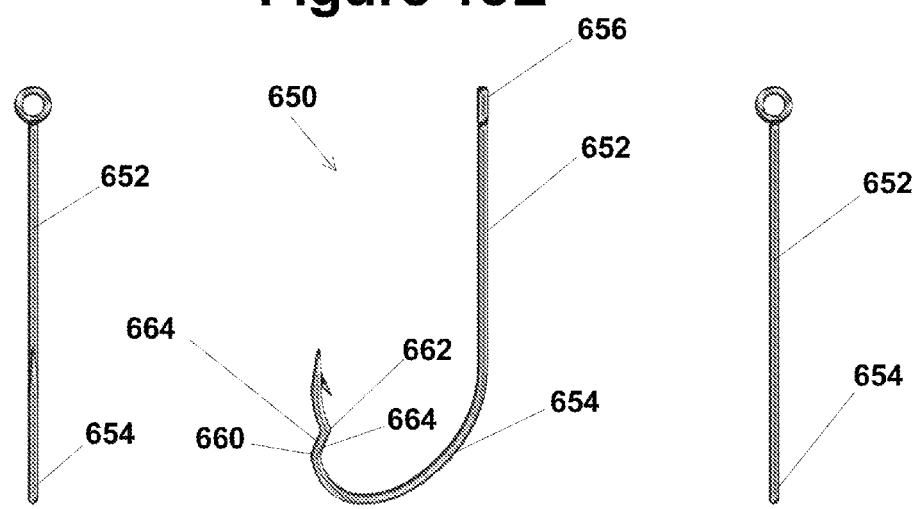
FIGS. 18A-E are side, rear, bottom, front and top views, respectively, of an additional embodiment of a fish hook having a retention offset in which the offset is formed with one clearly delineated angle and one curved angle.

Referring to FIGS. 10-12, the invention relates to an offset in the front length section of the hook which offsets a portion of the front length section from the bend section of the hook. This offset is in contrast to prior art hooks (FIG. 10) in which two or more segments are used to create a ridge or protrusion which functions as a stop or impedance to articles coming off of the hook. Such articles include hooked fish, bait (live or artificial) and other hooks (e.g., a trailer hook configuration). As illustrated in FIG. 10, a prior art hook has a ridge 10 formed from segments 6, 5 and 6' in the straight front length section 11 of the hook. As should be apparent from FIG. 10, the front length section 11 is continuous on both sides of the ridge 10 as segments 8 and 9. The configuration of the segments 6, 5 and 6' function to cause segments 8 and 9 of the front length section to be collinear along line A. The collinear positioning of segments 8 and 9 on opposite sides of the ridge 10 is understood in this application not to be an offset according to the invention. For example, in FIG. 10 a hypothetical projection of the segment 9 along its longitudinal axis would be collinear with the segment 8 along line A. It is recognized by the inventor that the fish hook has a bend portion 7 and the segment 9 is not collinear with that bend portion.

The depiction of a fishing hook with a feature that functions as a stop in FIG. 10 without an offset is contrasted with FIGS. 11A, 11B and 12 which depict two configurations of a fishing hook with a feature that functions as a stop but creates an offset in the hook between a portion of the front length section and the rest of the front length section or the bend section of the hook. The fish hook includes a first turn 450 in the wire and a second turn in the wire 454 and an offset segment 452 between the turns 450, 454. The turns in the wire 450, 454 and offset segment 452 cause an offset between a front length portion of the hook 458 and a projection 456 where the front length portion 458 would have extended through but for the offsetting function of the turns 450, 454 and segment 452. FIGS. 11A, 11B and 12 include pairs of circles A, B and C, D which illustrate different aspects of the offset function of the invention.

Based on the figures and description, it is believed that one of skill in the art will readily recognize the differences between a stop based on an offset of a front length of FIGS. 11A, 11B and 12 and a stop that does not include an offset but instead results in a collinear relationship between opposite sides of the stop as illustrated in FIG. 10. One manner of explaining this difference is the number of turns, number of segments and orientation of the segments forming the stop. In FIG. 10 the stop is formed from three segments 6, 5, 6' where 6 and 6' have opposite orientations and the same or substantially the same lengths. In this manner the segments 8 and 9 are collinear. It should be understood that two segments also can create a stop that results in a front lengths with collinear segments. For example, a hypothetical hook of FIG. 10 without segment 5 but only segments 6, 6' would create a stop in a front length portion that results in collinear segments 8 and 9. Such a stop would be approximately in the shape of a V.

In contrast, the offset feature of FIGS. 11A, 11B and 12 is formed from one segment 452 and does not include an additional segment that returns the wire of the hook to the projection 452. It should be understood that an offset can be created by multiple segments so long as they do not return the wire of the hook to the projection 456 or equivalent projection. In such an embodiment each segment would be oriented in the generally the same direction, e.g., towards the shank, as one moves along the wire of the hook from the shank to the tip.

It also should be understood in the explanation of an offset according to the invention that this feature can be understood by assigning points along the front length of the hook at measured intervals. In comparison to those points on the projection 456, the points on front length 458 will be offset by a distance and orientation that corresponds to the distance and orientation of the offset segment 452.

Referring to FIGS. 13A-E, a fish hook 500 includes a shank section 505, a bend section 510, a front length section 513, a point 515, and an offset section 520 positioned adjacent to the bend section 510 and the point 515. The offset section 520 is made up of two turns that include multiple segments 525, 526, 527, 528, and 529. The front length section 513 follows the radius of curvature of the bend section 510 at segment 529, and is also offset towards the shank of the hook due to the angles created by the multiple segments of wire. In particular, FIG. 13A shows the segments 525 and 527 forming an angle 540 and the segments 527 and 529 forming an angle 541.

The segment 527 is the offset segment that functions to offset the front length section 513 from the bend section 510. In FIG. 13A, the offset segment 527 is formed by a first turn in the wire 526 and a second turn in the wire 528. It should be apparent from the figures that the shank section 505, bend section 510, front length section 513, and offset section 520 are positioned within the same plane.

The embodiment illustrated in FIG. 13A shows the angles 540, 541 being approximately between 100 degrees and 160 degrees. Angle 540 and angle 541 may be the same or different, depending on the length of the offset segment as well as where the turns 526, 528 in the wire are positioned within the hook. The length of segment 527 may be varied depending on the extent of offset necessary to prevent a minnow or other bait from sliding off the bend of the hook. For example, segment 527 may range in length from about 1 mm to about 10 mm and more preferably between about 2 mm to about 5 mm. The turn 528 may be positioned within the bend section or front length section. The turn 526 is generally positioned within the front length section.

The offset created by the offset section 520 allows the gap of the hook 500 to be minimized and therefore allows a fish to more easily inhale or attach to the hook. The length of the section between the bend section 510 and point 515 is also minimized in FIG. 13A which further increases the ability for a fish to inhale the hook and be hooked. The distance between the farthest point of the bend section 510 to the point 515 may be varied to optimize the ability of the hook to be inhaled and retained within a particular type of fish. This feature of hook 500 is particularly advantageous when combined with the offset section 520 described above when optimizing the ability of a fish to inhale or bite a hook. Specifically, current hooks known in the art include a length between the bend section and the point that is sometimes too long to effectively achieve a bite by a fish. At times, a fish will inhale the hook containing bait but because of the bend to point length and the anatomy of a fish's mouth the fish is not able to inhale the hook, which results in a failure to attach the fish to the hook. Therefore if the front length is too long, the tip will not be inhaled all the way in before the fish spits out the lure/bait. The inventor has discovered that if the front length is shorter by the use of an offset section, the fish may inhale the entire hook, including the tip, and therefore should get caught.

One purpose of having a longer length from the bend section to the point is to prevent bait from slipping off the hook or a fish from throwing the hook once caught. However, including the offset section 520 according to the invention would allow the bend to point length to be minimized without the risk of the bait slipping off the hook.

FIGS. 13A-E show the side, top, bottom, back and front views of the fish hook 500. The barb these figures is option and may be present or absent at the point of the hook. In other words, the invention includes barbed and barbless hooks. The offset section 520 is designed to effectively prevent bait from sliding off the tip 515 regardless of whether a barb is present or absent. Similarly, the invention is not limited to any particular shank configuration but is generally applicable to most shanks. For example, the shank 505 can be straight wire as is depicted in FIGS. 3-6 or can have one or more offset segments or other feature to ensure placement of the bait, such as has already been described with respect to FIG. 7.

In another embodiment, the shank and/or bend may have one or more rubber stops placed along various points in order to further aid in retaining bait. These rubbers stops may be tension fit with the circumference of the wire such that they are secured in their desired location along the bend and/or shank. The rubber stops may be removable by the angler or may alternatively be manufactured as a permanent feature of the hook 500.

FIGS. 14A-F show another embodiment of an offset fish hook 550 having a pair of offset sections 552, 554 that define a segment 556 which is defined as the region in the bend section between the two offset sections. The segment 556 is intended to more securely retain bait, a caught fish, and/or a trailer hook to the hook 550. For example, a minnow placed on the hook 550 will be retained within the segment 556 based on the obstruction to its removal caused by the offset sections 552, 554. This advantageously prevents the minnow from moving out of either side of the bend 558. Specifically, the minnow will be hindered from moving up the shank 560 in one direction or over the front length section 562 and point 564 in the other direction. A worm placed on the hook similarly will be retained within the segment 556 of the bend 558. The bend need not necessarily follow the radius of curvature depicted in the figures, but may have a different shape or radius of curvature.

There are two offsets depicted in FIGS. 14A-E: a first offset 552 positioned on the front length side of the hook that protrudes inward towards the shank, and a second offset 554 positioned on the shank side of the hook that protrudes inward towards the point. The offsets are formed each by two turns in the wire that create an offset segment between the two turns in the wire. For example, the first offset 552 is formed by turns 566, 568 and offset segment 570. Similarly, the second offset 554 is formed by turns 572, 574 and offset segment 576. The extent of the offsets, e.g., angle and length, may vary for a number of reasons, such as the type of bait being used. The first and second offsets may be the same or different in length. Both offsets may range in length from about 1 mm to about 10 mm and more preferably between about 2 mm to about 5 mm.

FIGS. 15A-F provide an additional embodiment of an offset fish hook based on the offset segment including notches or grooves that provide resistance to the ability of a fish or bait to slide over the segment. The hook includes a shank segment 590, bend segment 592, front segment 594, and offset 596. The offset 596 is made up of a pair of turns 580, 582 and an offset segment 584. The offset segment 584 includes a set of grooves or notches 586. The grooves 586 are positioned on the inside surface of the offset segment 584 with respect to the shank. The grooves are positioned on this surface because a fish caught on the hook will be expected to be pulling against the inside surface of the hook.

Referring to FIGS. 16A-E, in a modification of the fishing hooks having an offset, a treble hook 600 includes three hooks 602, 604, 606 whose shanks terminate in a common eyelet 608. Each of the hooks 602, 604, and 606 may have the same or different configuration. Referring just to one hook, the hook 602 has a shank section 610, a bend section 612, a front section 614, an offset section 616 and a point 618 from which an optional barb 620 extends. Like the hook 500, the hook 600 has the offset section 616 that is made up of two turns. A first turn 622 in the wire is adjacent to the bend section 612 and a second turn 624 in the wire is adjacent to the front section 614. An offset segment 626 is defined as the wire of the hook passing between the first turn 622 and second turn 624.

FIGS. 17A-E illustrate an addition application of the offset hook concept to a fishing hook known in the art as a bass hook. The differences between a bass hook and some of those disclosed herein are the configuration of the shank and the bend portion adjacent to the shank. FIG. 17A illustrates a hook 630 having a shank 632 with a pair of turns 634, 636 in the wire. It should be noted that the configuration of the turns in the shank does not create an offset in the shank similar to the offset created in the bend section 638 and front length section 640 by the two turns 642, 644 and offset segment 646 creating the offset section 648. For example, if the shank 632 was projected beyond the turns 634, 636, it would not be collinear with the portion of the shank on the other side of the turns 634, 636.

An additional difference between the hook 630 and other versions disclosed herein is the radius of curvature of the bend section 638 of the hook. As evident from FIG. 17A, the radius of curvature is not constant throughout the length of the bend section. In the proximity of the shank section 632 the bend section has a greater radius of curvature than in the proximity of the front length section 640. Referring also to FIGS. 18A-E, a hook 650 is similar to the hook 630 except in the shank section 652. Hook 630 has a pair of turns in the shank adjacent to the eyelet which the hook 650 has a straight shank 652 between the bend section 654 and the eyelet 656. Similar to hook 630, the hook 650 has an offset section 658 made up of a pair of turns 660, 662 and an offset segment 664. The offset segment 664 results in the front length section 666 being offset relative to a projection of the front length section but for the offset created by the offset segment 664. An explanation of the projection of the front length section is explained above with respect to FIGS. 11-12.

As illustrated above, FIGS. 13-18 show a front length section that is curved and has a radius of curvature that is the same of substantially the same as the bend section of the hook at a position adjacent to the offset segment. The radius of curvature of the front length section causes the point of the hook to be directed towards the shank or a projection of the shank. In a variation of the hooks illustrated in FIGS. 13-18, the hooks of FIGS. 19-24 have an offset straight front length section that is oriented parallel or substantially parallel to the shank section. These hooks with a straight front length are described below.

FIGS. 19A-B are analogous to the bass hook of FIGS. 17A-E and illustrate a bass hook 700 having a shank section 702, a bend section 704, an offset section 706 and a front length section 708. The front length section 708 is offset by an offset segment 710 that extends between a pair of turns 712, 714 in the wire of the hook. The front length section 708 has an orientation that is generally parallel to that of the general orientation of the shank section.

FIG. 20 are analogous to the fishing hook of FIGS. 13A-E and illustrates a fishing hook 720 having a shank section 722, a bend section 724, an offset section 726 and a front length section 728. The front length section 728 is offset by an offset segment 730 that extends between a pair of turns 732, 734 in the wire of the hook. The front length section 728 has an orientation that is generally parallel to that of the general orientation of the shank section.

FIGS. 21A-B are analogous to the fishing hook of FIGS. 18A-E and illustrate a fishing hook 740 having a shank section 742, a bend section 744, an offset section 746 and a front length section 748. The front length section 748 is offset by an offset segment 750 that extends between a pair of turns 752, 754 in the wire of the hook. The front length section 748 has an orientation that is generally parallel to that of the general orientation of the shank section. The hook 740 has the same shank configuration as the shank of hook 720 of FIG. 20 but has a bend configuration of hook 700 of FIG. 21A.

FIGS. 22A-B are analogous to the fishing hook of FIGS. 14A-E and illustrate a fishing hook 760 having a shank section 762, a bend section 764, a first offset section 766, a second offset section 767 and a front length section 768. The front length section 768 is offset by an offset segment 770 that extends between a pair of turns 772, 774 in the wire of the hook. The front length section 768 has an orientation that is generally parallel to that of the general orientation of the shank section. The shank section and bend section are joined by the second offset section 767 that is made up of a pair of turns 776, 777 and an offset segment 778. As explained above, a fish hook having a pair of offset sections will retain bait, a fish or a trailer hook in the bend section between the offset sections.

FIGS. 23A-B illustrates a fishing hook 740 having a shank section 742, a bend section 744, an offset section 746 and a front length section 748. The front length section 748 is offset by an offset segment 750 that extends between a pair of turns 752, 754 in the wire of the hook. The front length section 758 has an orientation that is generally parallel to that of the general orientation of the shank section.

FIGS. 24A-B are analogous to the bass hook of FIGS. 16A-E and illustrate a treble fishing hook 760 having three hook sections. Each hook section includes a shank section 762, a bend section 764, an offset section 766 and a front length section 768. The front length section 768 is offset by an offset segment 770 that extends between a pair of turns 772, 774 in the wire of the hook. The front length section 768 has an orientation that is generally parallel to that of the general orientation of the shank section.

As illustrated above, FIGS. 13-18 show a front length section that is curved and has a radius of curvature that is the same of substantially the same as the bend section of the hook at a position adjacent to the offset segment. The radius of curvature of the front length section causes the point of the hook to be directed towards the shank or a projection of the shank. The hooks of FIGS. 19-24 have an offset straight front length section that is oriented parallel or substantially parallel to the shank section. In both of these general embodiments the offset if formed by a pair of turns creating an offset segment. Each turn in these figures is made up of two line segments intersecting to form an angle. FIGS. 25-30 illustrate a variation of the hooks for FIGS. 13-24 in which the offset section is formed by a pair of turns in the wire of the hook. However, in contrast to the figures above, one of the turns in the offset section of FIGS. 25-30 is a curved turn in the wire rather than a turn having a distinct angle formed by the intersection of two line segments. Nonetheless, like the earlier figures, the offset section of FIGS. 25-30 has a pair of turns and an offset segment between the turns.

Figure 25E:
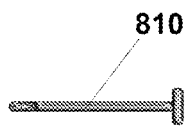
FIGS. 25A-E are side, rear, bottom, front and top views, respectively, of an embodiment of a fish hook having a retention offset in which the offset is formed with one clearly delineated angle and one curved angle.
Figures 25A, 25B, 25D:
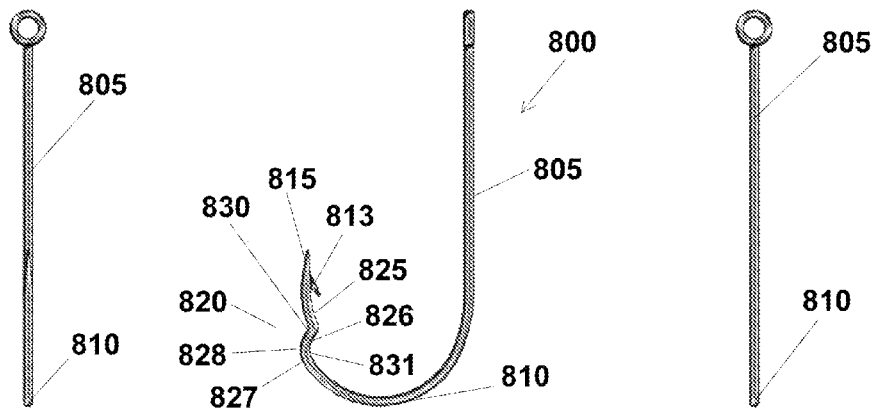
Figure 25C:
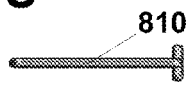

The fish hook of FIGS. 25A-E are analogous to the fish hook of FIGS. 13A-E but differ in the configuration in one of the turns forming the offset section. A fish hook 800 includes a shank section 805, a bend section 810, a front length section 813, a point 815, and an offset section 820 positioned adjacent to the bend section 810 and the point 815. The offset section 820 is made up of two turns that include multiple segments 825, 826 and 827. The front length section 813 follows the radius of curvature of the bend section 810 at segment 827, and is also offset towards the shank of the hook due to the angles created by the multiple segments of wire. In particular, FIG. 25A shows the segments 825 and 826 forming an angle 830 and the segments 826 and 827 forming an angle 831. However, in contrast to the angle formed by segments 825, 826, which is a clearly delineated angle formed by the intersection of two line segments, the angle 831 is formed by two segments 826, 827 joined by a curved segment 828. The curved segment 828 creates the angle 831 between the two segments 826, 827. If two tangential lines are drawn along the sides of the curved segment 828, the intersecting lines will form an angle.

The fish hook of FIGS. 26A-E are variations of the fish hook of FIGS. 25A-E but differ in the configuration of the bend section. The fish hook 840 includes a shank section 842, a bend section 844, a front length section 846, a point 848, and an offset section 850 positioned adjacent to the bend section 844 and the point 848. The offset section 850 is made up of two turns that include multiple segments 852, 854 and 856. The front length section 846 follows the radius of curvature of the bend section 844 at segment 856, and is also offset towards the shank of the hook due to the angles created by the multiple segments of wire. In particular, FIG. 26A shows the segments 852 and 854 forming an angle 858 and the segments 854 and 856 forming an angle 860. However, in contrast to the angle formed by segments 852, 854, which is a clearly delineated angle formed by the intersection of two line segments, the angle 860 is formed by two segments 854, 856 joined by a curved segment 862. The curved segment 862 creates the angle 858 between the two segments 854, 856. If two tangential lines are drawn along the sides of the curved segment 862, the intersecting lines will form an angle.

Figure 27E:
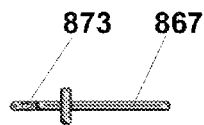
FIGS. 27A-E are side, rear, bottom, front and top views, respectively, of an embodiment of a fish hook having a retention offset in which the offset is formed with one clearly delineated angle and one curved angle.
Figures 27A, 27B, 27D:
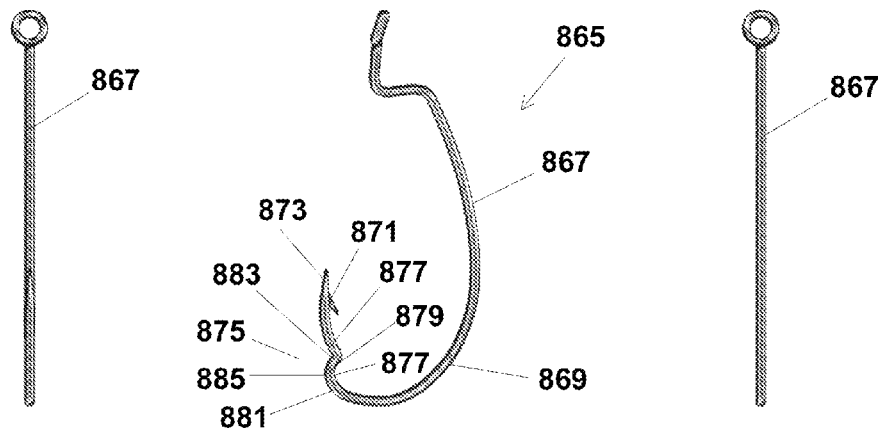
Figure 27C:
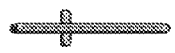

The fish hook of FIGS. 27A-E are variations of the fish hook of FIGS. 17A-E but differ in the configuration in one of the turns forming the offset section. The fish hook 865 includes a shank section 867, a bend section 869, a front length section 871, a point 873, and an offset section 875 positioned adjacent to the bend section 869 and the point 873. The offset section 875 is made up of two turns that include multiple segments 877, 879 and 881. The front length section 871 follows the radius of curvature of the bend section 869 at segment 881, and is also offset towards the shank of the hook due to the angles created by the multiple segments of wire. In particular, FIG. 27A shows the segments 877 and 879 forming an angle 883 and the segments 879 and 881 forming angle 885. However, in contrast to the angle formed by segments 877, 879, which is a clearly delineated angle formed by the intersection of two line segments, the angle 883 is formed by two segments 879, 881 joined by a curved segment 887. The curved segment 887 creates the angle 883 between the two segments 879, 881. If two tangential lines are drawn along the sides of the curved segment 887, the intersecting lines will form an angle.

Figures 28A, 28B:
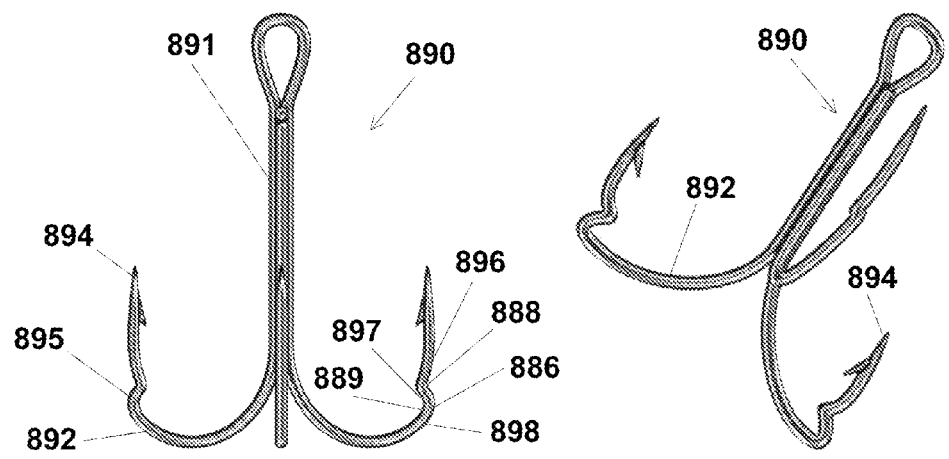
FIGS. 28A-C are side, rear, bottom, front and top views, respectively, of an embodiment of a treble fish hook having a retention offset in which the offset is formed with one clearly delineated angle and one curved angle.
Figure 28C:
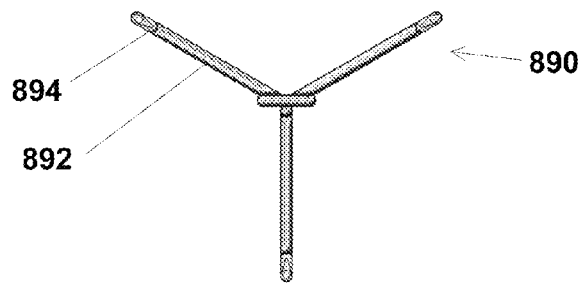
Figure 32E:
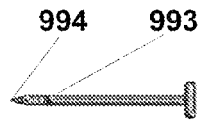
Figures 31D, 32A, 32B:
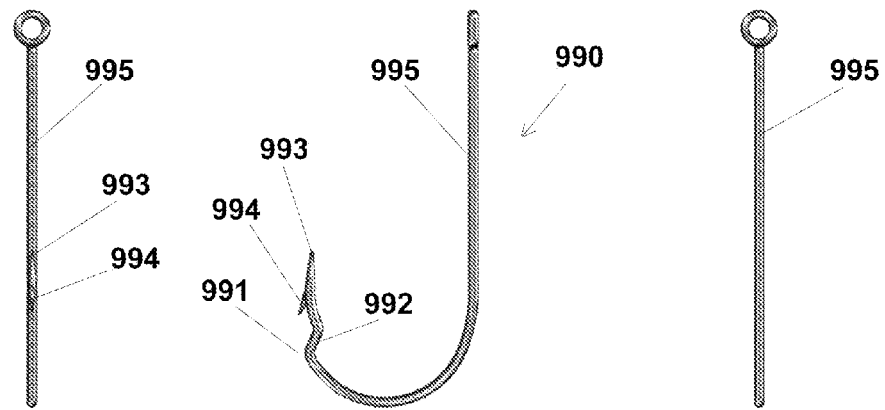
Figure 32C:

The fish hook of FIGS. 28A-C are variations of the fish hook of FIGS. 24A-B but differ in the configuration in one of the turns forming the offset section. The fish hook 890 includes a shank section 891, a bend section 892, a front length section 893, a point 894, and an offset section 895 positioned adjacent to the bend section 892 and the point 894. The offset section 895 is made up of two turns that include multiple segments 896, 897 and 898. The front length section 893 follows the radius of curvature of the bend section 892 at segment 898, and is also offset towards the shank of the hook due to the angles created by the multiple segments of wire. In particular, FIG. 28A shows the segments 896 and 897 forming an angle 888 and the segments 896 and 897 forming an angle 889. However, in contrast to the angle formed by segments 896, 897, which is a clearly delineated angle formed by the intersection of two line segments, the angle 889 is formed by two segments 897, 898 joined by a curved segment 886. The curved segment 886 creates the angle 889 between the two segments 897, 898. If two tangential lines are drawn along the sides of the curved segment 886, the intersecting lines will form an angle.

FIGS. 29A-E and 30A-E are variations of the above drawings but differ in the front length section being straight and the configuration of one of the turns forming the offset section. In particular, the offset section is formed of two turns of which one turn is formed by two intersecting segments forming a clearly delineated angle and the other turn is formed by two line segments joined by a curved segment to form a less clearly delineated line segment. These figures demonstrate that the various features described herein can be interchanged in a fish hook design.

FIGS. 29A-E are analogous to FIGS. 25A-E but differ in the front length section being straight rather than curved. Similarly, FIGS. 29A-E are analogous to FIGS. 19A-B but differ in one of the two turns being curved and one being formed by two line segments forming a clearly delineated angle. FIGS. 29A-E illustrate a fish hook 900 having a straight front length section 905 and an offset section 910 that offsets the front length section from the bend section 915. The offset section 910 is formed by two turns 920, 922 with the first turn 920 being formed of line segments 924, 926 and the second turn 922 being formed of line segments 926, 928, 930. The line segment 928 is a curved segment joining line segments 926, 930.

FIGS. 29A-E are analogous to FIGS. 25A-E but differ in the front length section being straight rather than curved. Similarly, FIGS. 29A-E are analogous to FIGS. 19A-B but differ in one of the two turns being curved and one being formed by two line segments forming a clearly delineated angle. FIGS. 29A-E illustrate a fish hook 900 having a straight front length section 905 and an offset section 910 that offsets the front length section from the bend section 915. The offset section 910 is formed by two turns 920, 922 with the first turn 920 being formed of line segments 924, 926 and the second turn 922 being formed of line segments 926, 928, 930. The line segment 928 is a curved segment joining line segments 926, 930.

FIGS. 30A-C are analogous to FIGS. 28A-C but differ in the front length section being straight rather than curved. Similarly, FIGS. 30A-E are analogous to FIGS. 24A-B but differ in one of the two turns being curved and one being formed by two line segments forming a clearly delineated angle. FIGS. 30A-C illustrate a fish hook 940 made up of three hook segments 942, 944, 946. Each fish hook segment has a straight front length section 948 and an offset section 950 that offsets the front length section from the bend section 952. The offset section 950 is formed by two turns 954, 956 with the first turn 954 being formed of line segments 958, 960 and the second turn 956 being formed of line segments 960, 962, 964. The line segment 962 is a curved segment joining line segments 960, 964.

FIGS. 31A-E are analogous to FIGS. 13A-E but differ in the offset segment being angled relative to the front length section and the curved sections such that the offset segment is generally parallel to the shaft of the shank. FIGS. 31A-E illustrate a fish hook 970 having a curved front length section 972 and an offset section 974 that offsets the front length section from the bend section 976. The offset section 974 is formed by two turns 978, 980 with the first turn 978 being formed of line segments 982, 984 and the second turn 980 being formed of line segments 984, 986.

FIGS. 32A-E illustrate an alternative embodiment of the fish hooks disclosed herein with the difference being the position of the barb in the front length of the hook. A hook 990 includes a shank 995, a front length section 991 with an offset section 992 and a point 993. Between the point 993 and the offset section 992 is a barb 994. In conventional hooks the barb extends from the front length potion generally in the direction of the shank. In contrast to conventional hooks, the barb extends in a direction that generally is away from the shank. It should be understood that while only FIGS. 32A-E illustrates a barb that extends generally away from the shank, this orientation of the barb may be applied to any of the hooks disclosed herein and variations of the hooks disclosed herein.

The hook can be made from a variety of conventional materials, such as high-carbon steel, steel alloyed with Vanadium, stainless steel, or a shape memory alloy or a superelastic alloy. For example, the alloy may be titanium or an alloy of titanium, predominantly nickel or an alloy of nickel. Suggested alloys are alloys that include from about 40 to about 50 weight percent of titanium, from about 50 to about 60 weight percent of nickel and from about 0 to about 10 weight percent of other alloying elements. Examples of other alloying elements that may be included in the nickel and/or titanium alloys include, but are not limited to, copper, iron, chromium, vanadium, hafnium and palladium. Desirably, such alloys are superelastic and maintain their superelastic properties within the temperature range of from about 30° F. to about 130° F. One commercially available version of such a superelastic alloy is Nitinol shape memory alloy. Nitinol alloy is considered particularly advantageous because of its superior properties, such as, shape memory, corrosion resistance, resistance to cyclical fatigue, and flexibility compared to stainless steel and most other metals that are typically used for springs and other fishing lure components. Advantageously, Nitinol and other superelastic alloys possess superelastic properties that allow the alloy to return to its original shape after being deformed substantially.

The hook can be formed using conventional methods, e.g., stamping and bending of a metal wire, in machines configured to form the bend, eyelets and offset segments.

While several particular forms of the invention have been illustrated and described, it will be apparent that various modifications and combinations of the invention detailed in the text and drawings can be made without departing from the spirit and scope of the invention. For example, references to materials of construction, methods of construction, specific dimensions, shapes, utilities or applications are also not intended to be limiting in any manner and other materials and dimensions could be substituted and remain within the spirit and scope of the invention. Accordingly, it is not intended that the invention be limited, except as by the appended claims.

What is claimed is:

1. A fish hook in the form of a wire comprising a shank section, a bend section, a front length section including a point, and an offset section positioned between the front length section and the bend section:
   the offset section includes a first turn in the wire and a second turn in the wire to form an offset segment of the offset section between the first and second turns in the wire, wherein the bend section, front length section, first and second turns in the wire, and the offset section are positioned within a single plane;
   the bend section having a bottom and a first radius of curvature at a position adjacent to the first turn in the wire at a location that is not within the offset segment and the front length section is substantially straight at a position adjacent to the second turn in the wire at a location that is not within the offset segment;

the offset segment creates an offset that offsets the front length section from the bend section such that a projection of the bend section and front length section without the offset would be substantially parallel to but not collinear with the bend section and front length section with the offset; and the fish hook is free of a second offset section that returns the wire of the hook to a position collinear or substantially collinear with the projection of the bend section, and wherein at least one of the first and second turns in the wire is positioned below a line bisecting a midpoint of a projected circle which is congruent with the bend section, the line bisecting the midpoint of the circle being parallel to a line tangent to the bottom of the bend.

2. A fish hook in the form of a wire comprising a shank section, a bend section, a front length section including a point, and an offset section positioned between the front length section and the bend section:

the offset section includes a first turn in the wire and a second turn in the wire to form an offset segment of the offset section between the first and second turns in the wire, wherein the bend section, front length section, first and second turns in the wire, and the offset section are positioned within a single plane;

the bend section having a bottom and a first radius of curvature at a position adjacent to the first turn in the wire at a location that is not within the offset segment and the front length section has a second radius of curvature at a position adjacent to the second turn in the wire at a location that is not within the offset segment, wherein the first radius of curvature and the second radius of curvature are substantially the same or different;

the offset segment creates an offset that offsets the front length section from the bend section such that a projection of the bend section and front length section without the offset would be substantially parallel to but not collinear with the bend section and the front length section with the offset; and the fishing hook is free of a second offset section that returns the wire of the hook to a position collinear or substantially collinear with the projection of the bend section, and wherein at least one of the first and second turns in the wire is positioned below a line bisecting a midpoint of a projected circle which is congruent with the bend section, the line bisecting the midpoint of the circle being parallel to a line tangent to the bottom of the bend.

3. The fish hook of claim 2, wherein the first turn in the wire consists of a first line segment and a second line segment joined together to form a first angle and the second turn in the wire consists of a third line segment and a fourth line segment joined together to form a second angle, the second line segment and the third line segment being a common segment in common between the first and second turns, the first angle being located closer along the wire to the shank section and the second angle being located closer along the wire to the front length section.

4. The fish hook of claim 2, wherein the first angle and the second angle each are independently between about 75° and 135°.

5. The fish hook of claim 2, wherein the first radius of curvature and the second radius of curvature are substantially the same.

6. The fish hook of claim 2, further comprising a third turn and a fourth turn in the wire, the third turn being positioned within the bend section adjacent to the shank section and the fourth turn being positioned adjacent to the shank section or in the shank section with the fourth turn being positioned closer in the wire to an eyelet of the fish hook relative to the third turn and the third turn being positioned further in the wire from the eyelet relative to the fourth turn.

7. The fish hook of claim 6, wherein the third turn in the wire consists of a fifth line segment and a sixth line segment joined together to form a third angle and the fourth turn in the wire consists of a seventh line segment and an eighth line segment joined together to form a fourth angle, the sixth segment and the seventh line segment being a common segment in common between the third and fourth turns, the fourth angle being located closer along the wire to the shank section and the third angle being located closer along the wire to the front length section.

8. The fish hook of claim 6, wherein the third and fourth turns in the wire are positioned to be symmetric to the first and second turns, respectively, in the wire.

9. The fish hook of claim 2, wherein the shank section is free of a turn in the wire that is in the proximity of an eyelet of the fish hook.

10. The fish hook of claim 2, wherein the shank section is free of a turn in the wire other than a turn in the wire that is adjacent to the bend section.

11. The fish hook of claim 2, wherein the offset section consists of the first and second turns joined by the offset segment and the offset section comprises the only offset section of the hook.

12. The fish hook of claim 2, wherein the offset segment is approximately between about 1-20 mm in length.

13. The fish hook of claim 2, wherein the offset segment is substantially parallel to the shank section of the hook.

14. The fish hook of claim 2, wherein the gam of the hook at a lower portion of the hook is less than the gap of the hook at a higher portion of the hook.

15. The fish hook of claim 2, wherein the shank section is free of an offset other than an offset that is adjacent to or in the bend section.

16. The fish hook of claim 2, wherein the fish hook is one hook of multiple hooks sharing a common eyelet, wherein each hook has the offset segment in the wire.

17. The fish hook of claim 2, wherein the hook having an offset segment is in the form of a trailer hook.

18. The fish hook of claim 2, further comprising one or more circumferential grooves formed within the wire in the offset segment.

19. The fish hook of claim 2, wherein the bend section at the position adjacent to the first turn in the wire is generally oriented in the direction of the shank section.

20. The fish hook of claim 2, wherein the fishing hook is free of a second offset section that returns the wire of the hook to a position collinear or substantially collinear with the projection of the bend section and the projection of the front length section.

* * * * *